May 13, 1952 J. F. ANDERSON 2,596,114
AUTOMOBILE AUXILIARY WINDOW MOUNTING
Filed July 12, 1949
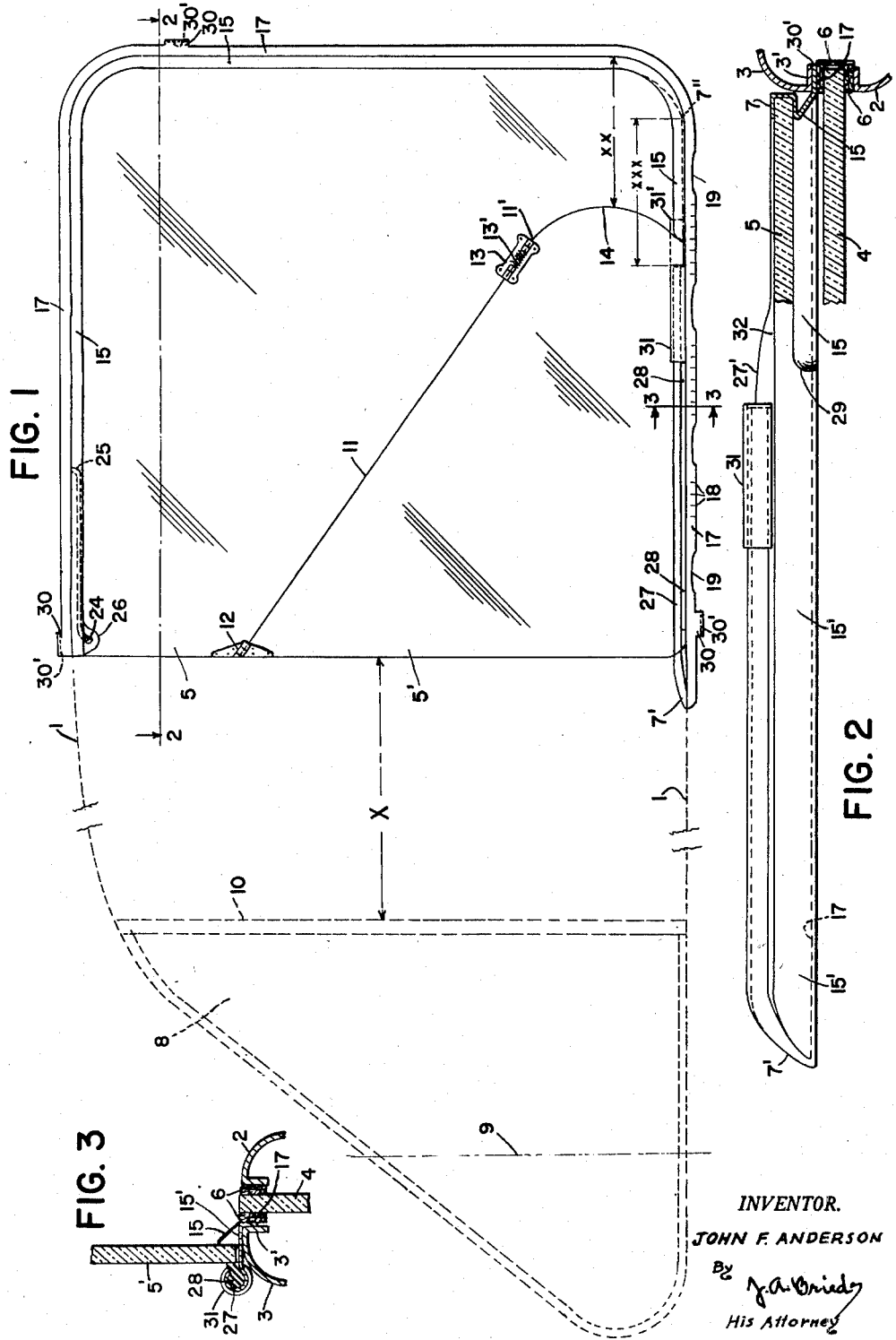
INVENTOR.
JOHN F. ANDERSON
By
His Attorney Patented May 13, 1952

2,596,114

UNITED STATES PATENT OFFICE 2,596,114

AUTOMOBILE AUXILIARY WINDOW MOUNTING

John F. Anderson, Oakland, Calif.

Application July 12, 1949, Serial No. 104,279

3 Claims. (Cl. 296—44)

This invention relates to auxiliary automobile windows or window panes such as used to control drafts against occupants of the vehicle yet permit arm signalling, of the general type disclosed in my copending patent application filed under Serial No. 558,003 on October 10, 1944, now patent No. 2,557,065, granted June 19, 1951, and a principal object of the present invention is to provide improvements over my former disclosure which will facilitate the insertion or removal of the auxiliary pane from normally fixed position in the automobile window opening to facilitate cleaning the inner side of the usual regular sliding window pane with which the automobile window comes equipped.

Other advantages of the present construction will appear in the following description and accompanying drawings.

In the drawings:

Fig. 1 is an outside elevation of a complete automobile window, such as that of the front door next to the driver and with my improved auxiliary pane in place as with the regular sliding window pane lowered.

Fig. 2 is a cross section taken along the line 2—2 of Fig. 1 showing the relation of the auxiliary pane to the regular sliding pane, and the nature of the auxiliary pane mounting rim.

Fig. 3 is a vertical cross sectional view of the lower run of the auxiliary pane mounting rim as seen from the line 3—3 thereof, to better show its form where the driver's arm extends over it in giving an arm signal.

Briefly described the dotted line 1 indicates the window opening of the left front door of an automobile, 2 is the outer molding or sheet metal edge around the window opening, 3 is the inner metal moulding, 4 is the regular vertically sliding window pane, 6 is the gasket lined groove in which the pane 4 slides, 5 is my auxiliary pane spaced slightly inward from the sliding pane and mounted in a special sheet metal rim 7 provided with grooves to receive it.

In further detail, the automobile door window is indicated as comprising the usual triangular draft shield pane dotted at 8 at the forward end of the window opening and which shield is vertically pivoted along an axis 9 in a manner not detailed as it is well known and forms no direct part of the present invention except in its general relation thereto, and the rearward edge of which draft shield closes against a fixed bar 10, rearward of which bar the forward edge of my auxiliary pane 5 is normally spaced about a third or more of the remaining horizontal length of the window opening as indicated by the dotted line designated X in the drawing.

Pane 5 is cut along an angular line 11 slanting rearwardly downward from a point preferably about two thirds the height of the window to a point 11' a distance from the bottom and then curved downwardly and finally forwardly to the lower edge of the pane to form an arm signalling panel 5' hinged at 12 and 13 to the upper or normally fixed panel 5 so to swing outwardly and upwardly when pushed outwardly (when the sliding pane 4 is in lowered position) for giving an arm signal by the driver and whose arm will finally be freely received within the curved lower end 14 of the opening thus provided.

The distance XX between the inner end 14 of the curved recess and the extreme rear end of pane 5 (or main window opening) will vary with the total length of the automobile door window as some are proportionately much longer than others.

It may be stated that for safety the panes 5 and 5' may be of any transparent plastic or other glass-like material, though if desired they may be of real glass or the so-called safety glass if desired.

The general cross section of the mounting rim 7 is clearly shown in Fig. 2 with a U-shaped groove receiving the margin of the auxiliary pane 5. This rim is preferably made of springy sheet metal and provided with a flange 15 extending angularly outward from the inner edge of the U-shaped groove to meet the metal moulding 3 of the door, and from which point the flange is bent to extend parallel with the pane between the gasket 6 and the inner return edge 3' of the moulding 3 as at 17 to form a retaining lip, best shown in Figs. 2 and 3.

This lip 17 may be cut transversely at intervals as at 18 so that at any point where the gasket securing rivets or staples (not shown) are in the way of inserting the lip to the position shown in Figs. 2 and 3, a short section of the lip may be broken off with a pair of pliers, or for automobiles of a given make where the spacing of the staples is always alike the lip may be furnished with ground out or cut away portions such as shown at 19 in Fig. 1 to clear the known staples.

As the auxiliary mounting rim as a whole is itself U-shaped since its two ends are not cross connected, the entire rim (with pane omitted) may be sprung into place by first bending the free ends toward one another and working the vertical run into place, and then the horizontal runs, and which being of spring metal preferably biased slightly outward will tend to stay in place. However, means may be provided to further lock the rim in place such as one or more slight extensions of the retaining lip 17 as indicated in Fig. 1 at 30 and which are slightly hooked as at 30' to engage slightly over the inner edge 3' of the door molding 3 when forced into place.

After the auxiliary pane has been put in place it may be locked against moving forward with respect to the rim by any suitable means, such as by a spring pin 24 which is welded at one end 25 to the mounting rim, and which pin passes through a hole in a lug 26 at one side of the mounting rim and into an aligned hole in the upper margin of the pane 5.

To permit the pivoted pane or panel 5' to swing outwardly on its hinges 12, 13, the outer wall of the pane receiving groove is omitted from adjacent the bottom of the curve 14 to the lower free end 7' of the rim and the inner wall is rounded into a tubular bead 27 so that the driver's arm will slide over it easily when swinging it outward to give a signal—see Fig. 3 where this construction is shown. Also in this view is shown a rubber or felt bumper strip 28 held within the bead 27 to break the fall of the hinged pane 5' when the signalling arm is withdrawn quickly.

The hinged panel 5' will normally remain closed by gravity action, but I prefer to provide hinge 13 with a closing spring 13', and also a detent on the rim to guard against its rattling, and which detent is shown here as a slightly extending rounded end of the outer groove wall at 29 over which the lower edge of the hinged panel must spring in closing or opening—(see Figs. 1 and 2 for these details) though such a detent may be arranged anywhere along the flat surface 15' of the lower leg of the rim.

To permit putting the auxiliary pane 5 and its hinged panel 5' into the groove of the rim when the rim is in place, the inner wall of the groove 7 is cut away for the distance XXX (see Fig. 1) and rounded up to the vertical run of the rim, as dotted at 7'' so that when the locking pin 24 is withdrawn the pane 5 may be moved forward to carry its vertical edge out of the groove of the vertical run of the rim, and after which the pane may be moved bodily inward of the automobile to clear the lower run of the rim and then moved bodily downward to withdraw it from the groove in the upper run of the rim.

To stop the lower margin of pane 5 from rattling where the inner edge of the groove is omitted I provide a slider which takes the place of the inner wall. This slider is a thin sheet metal tubular section 31 which fits snugly over the bead 27 and may be slid from the full line to the dotted position in Fig. 1 rearward to project in back of the forward lower end of the pane 5 to form an inner stop for this lower edge of the pane where the inner wall of the groove is cut away as at 7''. The slider 31 is stopped in the extended dotted position 31' by jamming against a notched or bent portion at 32 of a substantially flattened extension 27' of the tubular bead 27.

With the construction above described its operation should be easily understood as the manner of inserting the special sheet metal mounting rim in an existing automobile door window (or body window if desired) has been explained, and conversely if necessary the rim can be removed if some force be applied to disengage the hooks 30'. The auxiliary pane 5 together with its hinged panel 5' may be easily inserted or removed when required, to facilitate cleaning between it and the regular sliding pane of the window or to wash the inner side of the latter. Also the advantages of the curved (14) rear end of the swinging panel to fit the signalling arm and prevent wedging of the arm in the recess are thought clearly brought out, as well as the various details of construction for holding the parts in place. Also to be noted is that the lower beaded (27) and flat (15') run of the mounting rim is extended beyond the pane and beveled as at 7'' so that the driver's arm will slide over it when swinging outward to give a signal.

Also the compact construction in which the auxiliary window pane and its metal rim when in position are wholly within the window recess of the automobile.

It is of course evident that while I prefer the use of springy sheet metal for the mounting rim any tough plastic of similar properties, if permanent, tough and strong, may be used instead, and such substitute materials are to be included in my use of the word metal in my appended claims.

I therefore claim:

1. In an automobile door window having a vertically slidable pane operating in a gasket lined groove, an auxiliary draft controlling pane spacedly positioned inward of the sliding pane and extending from the rear end of the window but terminating at its forward end a substantial distance short of the forward edge of the sliding pane, a thin grooved metal rim in which the margin of the auxiliary pane is seated, said rim being as a whole generally of U-shape with its two legs free for springing toward one another and of a size and shape to fit snugly within the window opening framing and provided with a lip formed to engage between the gasket liner and the window framing, the rim being of thin springy material so that it can be distorted for progressive insertion into place and the auxiliary pane slid into place in the groove from the free ends of the rim after the rim is inserted, and releasable means for locking the auxiliary pane from reverse sliding with respect to the rim.

2. In a structure as set out in claim 1, one edge of the grooved metal rim being extended and bent outward at an angle from said rim to form a flange extending to the frame of the window opening and there provided with the further extending lip to engage between the window framing and gasket liner for the sliding pane as set out.

3. In a structure as set out in claim 1, said auxiliary pane provided with a forward lower triangular pane section hinged directly thereto to swing outwardly from the bottom, and said grooved metal rim having its outer wall omitted for the lower margin of the hinged section to swing as stated, and a frictional detent provided on said rim outward of and to hold the hinged section in closed position.

JOHN F. ANDERSON.

REFERENCES CITED

The following references are of record in the file of this patent:

UNITED STATES PATENTS

| Number | Name | Date |
|---|---|---|
| 1,753,795 | Linn et al. | Apr. 8, 1930 |
| 1,939,273 | Osborne | Dec. 12, 1933 |
| 2,182,107 | Anderson | Dec. 5, 1939 |
| 2,242,606 | Duncan | May 20, 1941 |